United States Patent [19]

Spriet

[11] 3,983,862

[45] Oct. 5, 1976

[54] PROCESS FOR MAKING NON-CRYSTALLINE SUGARY MATERIALS FROM SUGAR AND GLUCOSE SYRUP

[75] Inventor: Francois Spriet, Firminy, France

[73] Assignee: Creusot-Loire, Paris, France

[22] Filed: Dec. 26, 1974

[21] Appl. No.: 536,408

[30] Foreign Application Priority Data
Dec. 28, 1973 France .......................... 73.46887

[52] U.S. Cl. .................................. 127/58; 127/22; 127/30; 127/61; 259/192; 426/492; 426/660; 264/349; 425/113
[51] Int. Cl.² ...................... A23G 3/00; C13K 13/00
[58] Field of Search ................... 426/380, 660, 492; 127/22, 21, 58, 61; 259/192

[56] References Cited
UNITED STATES PATENTS

| | | | |
|---|---|---|---|
| 2,048,286 | 7/1936 | Pease | 23/252 UX |
| 3,085,288 | 4/1963 | Street | 259/192 |
| 3,104,420 | 9/1963 | Selbach | 259/192 |
| 3,265,508 | 8/1966 | Wurzburg | 426/380 |
| 3,265,510 | 8/1966 | Wurzburg | 426/380 |
| 3,382,536 | 5/1968 | Fritsch | 259/192 |

Primary Examiner—Morris O. Wolk
Assistant Examiner—Sidney Marantz
Attorney, Agent, or Firm—Cameron, Kerkam, Sutton, Stowell & Stowell

[57] ABSTRACT

Non-crystalline sugary materials are made from sugar and glucose syrup by heating an undissolved mixture of undiluted crystallized sugar and liquid glucose in an extrusion machine having meshing screws within a casing with means for heating the casing to heat the mixture to about 130°C and to knead the mixture as it passes through the machine. The material leaving the machine is non-crystalline sugary matter suitable for confectionery use.

5 Claims, 3 Drawing Figures

PROCESS FOR MAKING NON-CRYSTALLINE SUGARY MATERIALS FROM SUGAR AND GLUCOSE SYRUP

The object of the invention is a method of making non-crystalline sugary matter for the manufacture of confectionery, and a machine for putting the method into effect.

Confectionery products are normally manufactured starting with sugar, glucose and water. The water serves solely to dissolve the sugar which is obtained industrially in the crystalline state, in order to ensure removal of crystals. Generally, therefore, a syrup is first of all made on a basis of glucose and water in a receiver heated in order to facilitate dissolving of the sugar, then this syrup is boiled in order to evaporate the excess water. In conventional methods manufacture is effected in a discontinuous fashion in a number of receivers and under vacuum. Continuous methods are however known in which boiling is effected in a thin layer so that the boiling temperature can be otained very quickly and hence be higher than in conventional methods. For example, a screw is employed which revolves inside a hollow cylinder, clearance arranged between the outer portion of the screw and the cylinder enabling the required thin layer to be obtained.

In all the known methods one is therefore obliged to dissolve the crystallized sugar beforehand in water and then to get rid of the water. It may be deemed that this employment of water as solvent which must later on be got rid of is not very rational but nevertheless up to now it has been considered indispensable because of the difficulty of removing crystals of the sugar by other means. The object of the invention is a method enabling removal sugar crystals to be achieved without prior solution in a significant quantity of water which it would be necessary to get rid of later on.

In accordance with the invention, without prior solution of the sugar, boiling is carried out of a mixture of crystallized sugar and liquid glucose in an extrusion machine comprising at least two screws meshing together inside a casing, at least one outlet orifice at the downstream end and means of heating the casing.

The liquid glucose employed is the product found in the trade and sometimes called "crystal glucose or glucose syrup or corn syrup". It is known that this product generally contains about 20% water.

The invention will now be described by referring to a particular embodiment given by way of example and illustrated in the drawings attached.

In the example illustrated, the machine comprises a casing 1 surrounding two screws 2 and 3 meshing together. Each screw is composed of a certain number of sections joined side by side in a stack on a splined shaft and clamped up together. The clearance between the screws is very small and the profiles are designed in such a way that the one screw constantly cleans the other.

Figure 2:
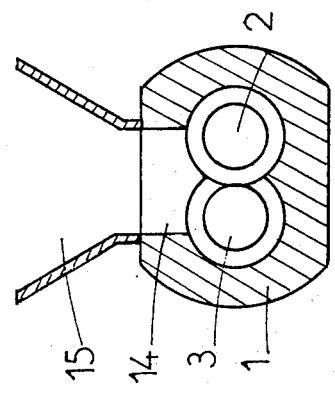
FIG. 2 is a transverse section along II—II in FIG. 1.

There is thus defined on each screw from upstream to downstream a section 21, 31 having a relatively wide pitch, a section 22, 32 having a narrower pitch, a section 23, 33 having a wider pitch and a section 24, 34 having a narrow pitch. Each screw ends in a point and the casing in turn is furnished at its end with a conical portion 11 extended by a nozzle 12 surrounding the outlet orifice 13. At the upstream end of the machine there is arranged a feed-orifice 14 (FIG. 2) into which opens a funnel 15 through which the materials are introduced.

In accordance with a characteristic of the invention the machine is fed with a mixture of crystallized sugar and liquid glucose which are introduced separately at ambient temperature into the funnel 15. The crystallized sugar is normally run in by a feeder device consisting of a stainless steel hopper at the bottom of which revolves an archimedean screw of constant pitch driven at variable speed, which enables accurate volumetric proportioning of the sugar to be achieved. The liquid glucose is run directly into the funnel from a tank furnished with a cock, the interior of the tank being preferably put under pressure so as easily to adjust the flow of glucose.

It is thus possible to vary as necessary the proportions of sugar and liquid glucose.

The whole of the machine is heated by means of devices 4 surrounding the casing. Preferably a number of heating devices distributed along the casing 1 is used, the temperatures of which may be regulated separately so as to keep each portion of the machine at a certain temperature. Thus there will be obtained progressive heating of the material by accurately controlling the temperature at all points on the machine. Normally the temperature regulating devices will be regulated between 50° and 100°C upstream (41), between 150° and 200°C in the central portion (42) and between 160° and 180°C downstream (43), so that the material is brought progressively to a temperature of about 130° to 140° in the central portion and may reach 150° at the outlet from the machine.

Figure 1:
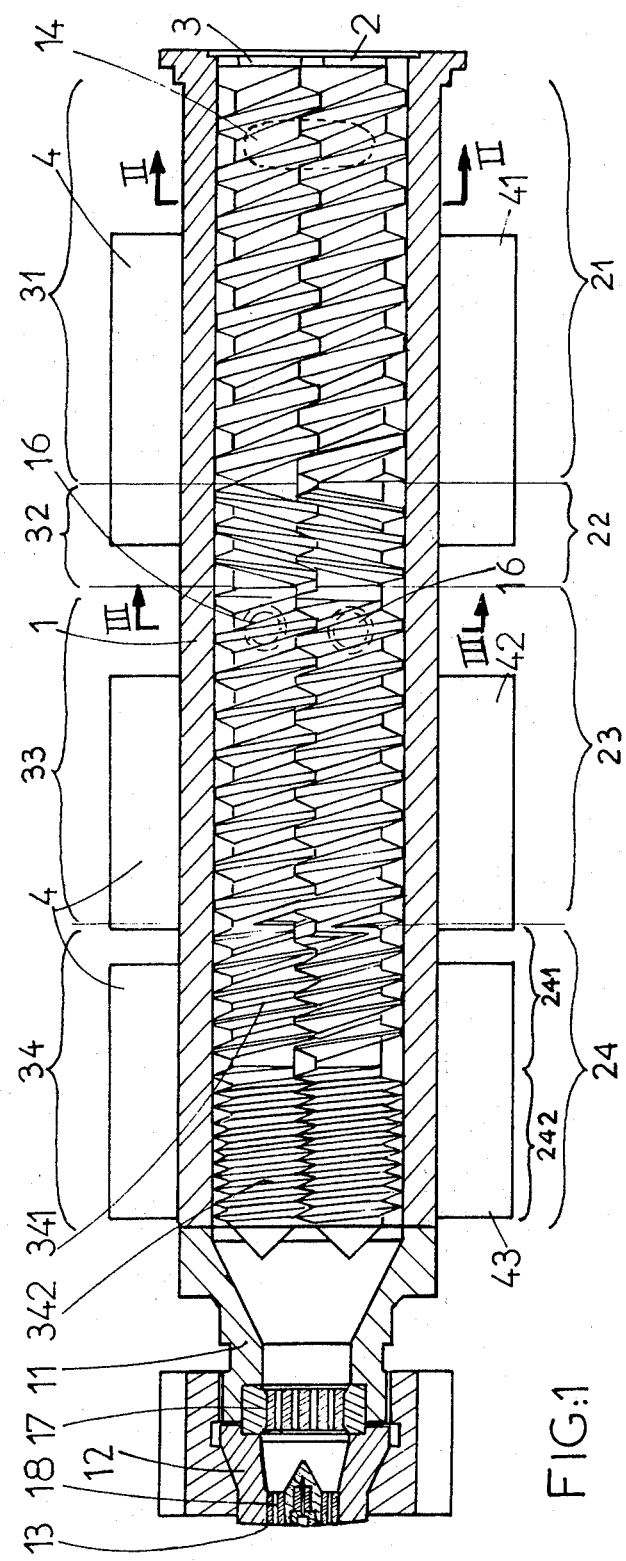
FIG. 1 is a plan view in longitudinal section of the machine in acordance with the invention.
Figure 3:
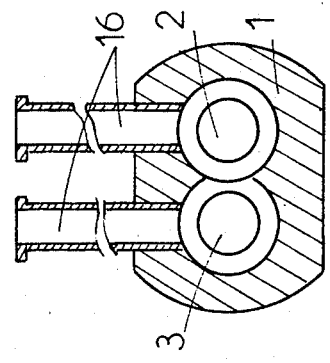
FIG. 3 is a transverse section along III—III in FIG. 1.

In case of need the casing will be furnished with a degassing-well 16 (FIG. 3) which if necessary may be put into communication with a vacuum-pump.

At a speed of rotation of the screws of 80 to 120 r.p.m. and employing threads of 1.5 mm diameter a flow of 70 to 80 kg per hour of primary materials may be handled, which comprise essentially crystallized saccharose and liquid glucose containing 20% water, in equal proportions.

As already indicated, one of the characteristics of the machine depends on the fact that the sugar crystals are not removed by prior solution in water, the removal of crystals being on the contrary effected inside the machine. That is why there are introduced separately through the funnel 15 at ambient temperature crystallized sugar and liquid glucose which form a viscous mixture in the feed-zone 21. This viscous mixture would not be able to be moved in a single-screw machine. But in a multi-screw machine a pumping effect is obtained on the material, which enables feeding forward to be obtained, of even a very viscous material. In addition, the meshing of the two screws causes intense kneading of the two components of the mixture all along the machine. Removal of the sugar crystals is thus obtained by the combined effect of this kneading, the raising of the temperature and the putting under pressure. In fact the feed-zone 21 is followed by a braking zone 22 composed of a section of screw with a narrow and even if necessary reverse pitch. The material is therefore braked in this zone and in order to overcome this loadloss it must be put under pressure upstream that is to say, in the feedzone. The result is in addition more intense kneading. At the end of this zone the material has reached a temperature of about 130° and passes into an expansion zone 23(33) in which the screws have a wider pitch. In this zone the water contained initially in the liquid glucose in a proportion of about 20%, which had enabled starting of the removal of the sugar crystals in the preceding zone, can escape in the form of steam through the degassing wells 16, degassing being if necessary favoured by putting under vacuum, for example, at a pressure of 20 mm Hg. The result is that a practically anhydrous product is obtained at the end of the expansion zone. This product is then put under higher pressure in the compression zone 24 having a narrow pitch, so as to pass through the nozzle 13 where the pressure can reach 200 bars. The compression zone 24 may advantageously be composed of a precompression section 241 having closer pitch than the expansion section 23, the section 241 being followed by a pumping section 242 having a very close pitch in order to ensure passing of the material into the outlet nozzle. A grid 17 and a filter 18 interposed upstream of the outlet orifice 13 brake the discharge of the product, raising the pressure in the compression zone 24, and cause a final kneading by an effect of shearing and turning over of the material. This final compression of the product with particularly intense kneading ensures perfect homogenization which enables elimination of the crystals possibly persisting in the anhydrous product, so that at the outlet from the machine there is obtained a melted product completely free of crystals and ready to be employed for confectionery.

In fact, examined with the naked eye the boiled sugars obtained by the method in accordance with the invention are perfectly transparent and colourless. Microscopically and in polarized light the absence of crystals can be observed. Only a few points scattered in the mass and of the size of a few microns have been able to be seen in certain samples.

Moreover the machine exhibits great flexibility of adjustment and by adjusting the various parameters such as the speed of rotation of the screws and their profile, the flow and the proportions of the primary materials, it is possible to control the process of crystal removal which is moreover perfectly repeatable as tests carried out at various intervals of time have shown.

In a variant upon the method the degassing well 16 which was located in the central portion of the machine may be eliminated. The wide-pitch expansion zone 23 will likewise be eliminated, compression of the product being effected in a continuous fashion from upstream to downstream of the machine. In that way the amount of water contained initially in the liquid glucose will remain integrated in the form of superheated steam in the viscous product. The intense kneading achieved by the machine will enable uniform distribution of the steam to be obtained and it will be released at the outlet from the machine to cause expansion of the product. Thus cellular sugary products will be obtained.

Of course the invention is not limited to the details of the embodiment and the variant which have just been described. It encompasses on the contrary other variants and especially those which would differ from them only by the use of equivalent means.

Thus if one of the characteristics of the machine is to be fed separately with crystallized sugar and liquid glucose without prior solution of the sugar, there remains more the less the possibility of its being considered useful to introduce likewise into the feed-orifice a certain amount of water which is thus added to that contained in the liquid glucose. This amount might, for example, be about 15% of the volume of glucose.

In addition, the effect of kneading and homogenization obtained favours mixture of the sugary matter with other products such as flavours, colorants or expander agents which may be introduced through the funnel upstream of the machine.

It can be seen that one of the advantages of the machine is to achieve in one single enclosure of relatively small dimensions the whole of the operations of manufacture of a melted crystal free product directly employable for confectionery, from basic materials introduced separately upstream of the machine. But the essential advantage of the method is to avoid removal of the sugar crystals by prior solution in a large amount of water which it would be necessary to get rid of later on, crystal removal being effected in the machine itself.

The speed of the process will likewise be observed, the mean dwell time of the material in the machine being from 1 to 2 minutes.

What I claim is:

1. A method of manufacturing non-crystalline sugary matter for confectionery from crystalline sugar and liquid glucose comprising separately introducing the crystallized sugar and the liquid glucose into an extrusion machine so as to form a mixture therein, subjecting the mixture to heat and kneading under pressure in an upstream portion of the machine, expanding and dehydrating the mixture in a central portion of the machine with the elimination of the resulting steam, and kneading under pressure and progressively heating the mixture up to a temperature of about 130°C in a downstream portion of the machine whereby the resulting sugary matter discharged from the machine is practically anhydrous, said extrusion machine comprising at least two meshing screws inside a casing, said kneading under pressure and said expanding and dehydrating resulting from the pitch of the screws in the respective portions of the extrusion machine.

2. A method as described in claim 1, including the steps of kneading and heating the mixture up to a temperature of about 130° under pressure all along the machine, maintaining superheated steam inside the material and releasing the steam with expansion of the material after leaving the machine.

3. A method as described in claim 1, including the step of adjusting the water content of the liquid glucose to about 20%.

4. A method as described in claim 1 including the step of adding a certain quantity of water to the mixture of sugar and liquid glucose which is fed to the machine.

5. A method described in claim 1 including the step of introducing the crystallized sugar and the liquid glucose into the machine at ambient temperature.

* * * * *